D. Witt.
Spring-Holder.
Nº 73559.   Patented Jan. 21, 1868.
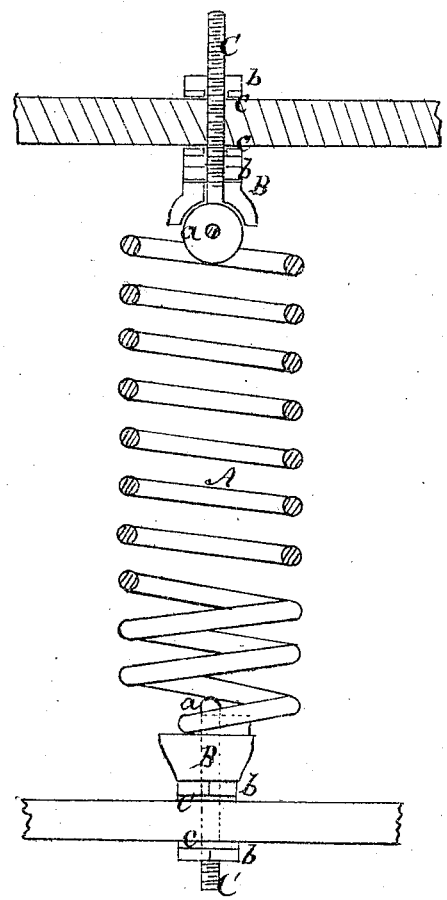

United States Patent Office.

DANIEL WITT, OF HUBBARDSTON, MASSACHUSETTS, ASSIGNOR TO DEXTER HOWE, OF NEW YORK CITY.

*Letters Patent No. 73,559, dated January 21, 1868.*

IMPROVED SPRING-HOLDER.

*The Schedule referred to in these Letters Patent and making part of the same.*

TO ALL WHOM IT MAY CONCERN:

Be it known that I, DANIEL WITT, of Hubbardston, in the county of Worcester, and State of Massachusetts, have invented a new and useful Improvement in Attaching or Securing Springs; and I do hereby declare that the following is a full, clear, and exact description thereof, which will enable others skilled in the art to make and use the same, reference being had to the accompanying drawing, forming part of this specification.

This invention relates to a new and improved mode of securing or holding springs, and is more especially designed for securing or holding in position upholstery-springs and those which are applied to chairs, &c., &c.

The object of the invention is to obtain a simple and economical means, which will admit of the springs being readily attached to the fixtures designed for them, and which will firmly hold the springs in position.

The accompanying drawing represents a side view of my invention, partly in section.

A is the spiral spring, which may be constructed in the ordinary manner, and of any suitable size or dimensions. B B represent metal sockets, through which screw-bolts C pass loosely, said bolts having eyes, $a$, at their inner ends, which partially fit in the inner ends of the sockets, as shown clearly in the drawing. On each screw-bolt, C, there are placed nuts $b$ and washers $e$, and, by means of the bolts and nuts, the spring is secured to the fixtures, shown in red, the bolts passing through the fixtures, the ends of the spring passing through the eyes $a$ of the bolts, and the sockets B firmly clamped to the fixtures, by screwing up the nuts $b$.

This invention is applicable to flat and other springs, as well as to spiral ones. All that is required is simply to form a proper connection between the inner ends of the bolts and the ends of the spring, and the manner of doing this will suggest itself to any mechanic of ordinary ability.

By referring to the drawing, it will be seen that a nut, $b$, is on each side of each fixture. The nuts on the inner side serve to secure the ends of the spring to the sockets, while the nuts on the outer side serve to secure the sockets and spring to the fixtures. This arrangement admits of the spring and sockets being detached from the fixtures without detaching the sockets from the spring.

Having described my invention, what I claim as new, and desire to secure by Letters Patent, is—

The spring A, in combination with the screw-bolts C, sockets B, and nuts $b$ $b$, substantially as described, for the purpose specified.

The above specification of my invention signed by me, this 4th day of December, 1867.

DANIEL WITT.

Witnesses:
WM. F. MCNAMARA,
ALEX. F. ROBERTS,